United States Patent Office 2,941,422
Patented June 21, 1960

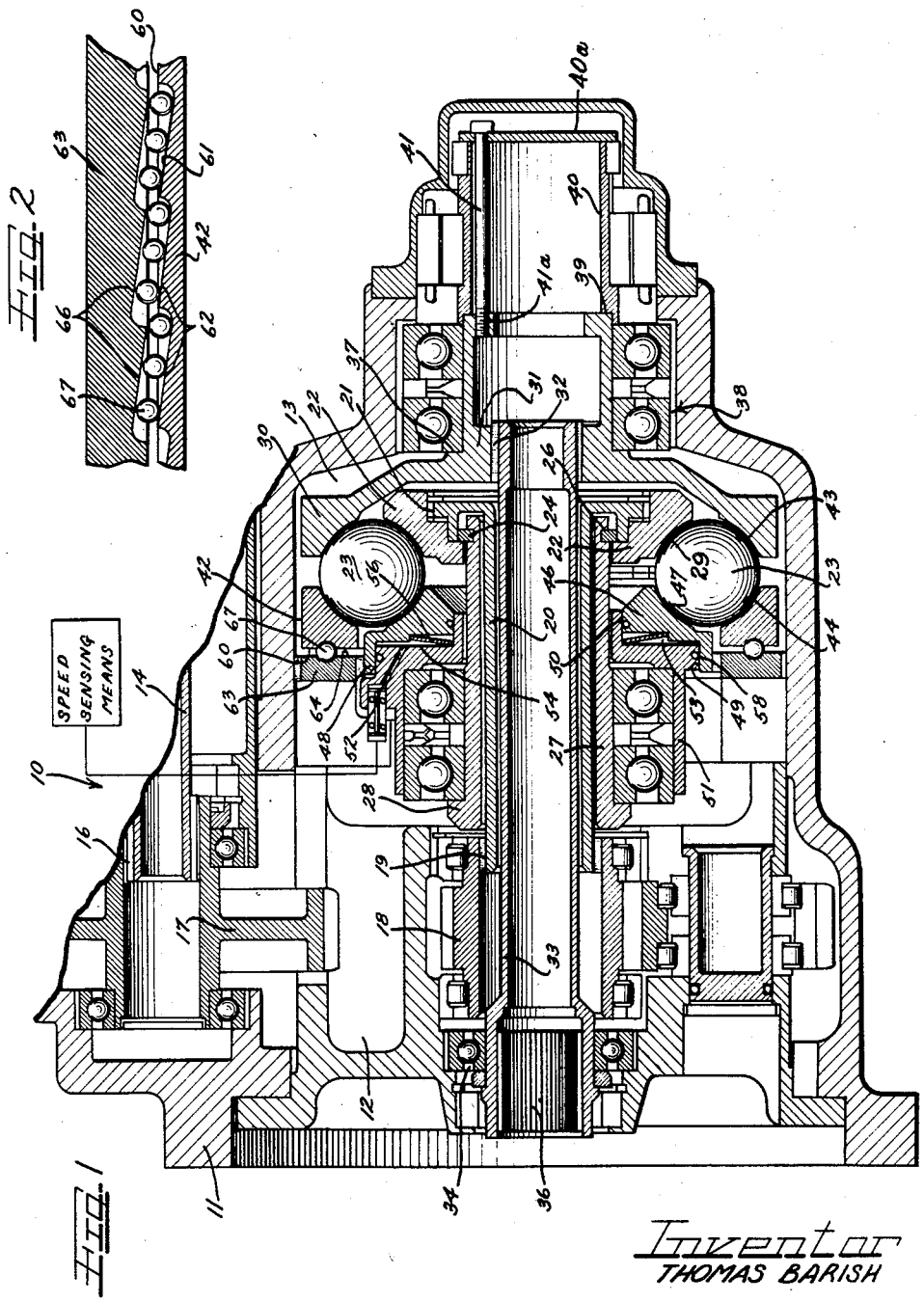

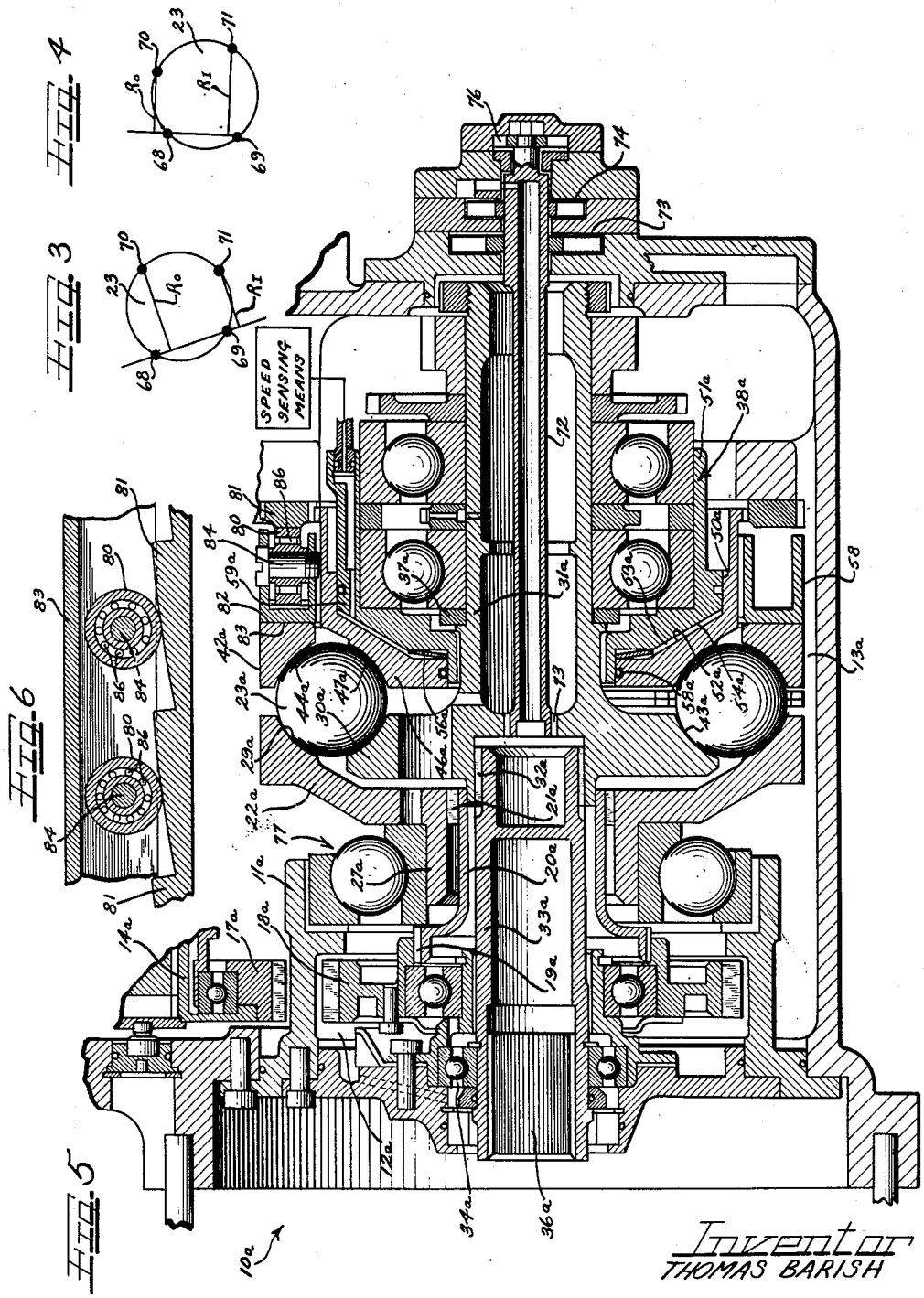

2,941,422

CONSTANT SPEED DRIVE

Thomas Barish, Shaker Heights, Ohio, assignor to Thompson Ramo Wooldridge Inc., a corporation of Ohio Filed Oct. 4, 1957, Ser. No. 688,283

14 Claims. (Cl. 74—796)

This invention relates generally to a constant speed drive wherein the ratio of speeds is changed so that when the driving or engine speed varies, the change is sensed in a governing device and the apparatus changes the ratio to keep the output speed very constant.

The mechanism of the present invention comprises essentially a system of planetary balls and race rings transmitting rotation by friction. Four load-carrying rings are included; an output ring and input ring, as well as two non-rotating rings, one of which being axially movable and adjustable as a function of speed and the other being axially movable and adjustable so as to be load or torque reacting.

The curved bearing surfaces of the race rings closely approximate the curvature of the planetary balls, however, there is sufficient relative flaring between the adjoining confronting surfaces to afford a material change of contact angle so that axis of ball rotation will tilt considerably and each ball acts as a countershaft of variable ratio. The curvature of the races also affords a great inverse in load capacity.

Although the principles of the present invention are of general applicability, a particularly useful application thereof is made in connection with the driving of electrical alternators. With electrical alternators, it is desirable in paralleling alternators electricaly that the drive mechanism have normal droop characteristics. Thus there is required a speed drop-off when load increases (i.e., without governor acting).

In accordance with the principles of the present invention, a normal droop characteristic is provided in the drive mechanism by situating non-rotating race ring which is axially adjustable as a function of speed axially opposite the rotatable output ring. By virtue of such provision, the change in radii resulting upon an increase in load will result in a tendency towards a speed decrease, thereby providing the desired normal negative droop characteristics. In other words, the specified rings can be either radially innermost or outermost, so long as both are axially opposite one another.

It is contemplated according to the present invention that the non-rotating ring which is axially adjustable as a function of speed will be preloaded with a continuous biasing means such as a spring so that torque loading will start rotation and so a no-load start will not result in the parts racing around. Gripping at critical surfaces is thus assured.

It is an object of the present invention, therefore, to provide an improved driving device which overcomes the deficiencies of the prior art.

It is another object of the present invention to provide a fluid pressure loaded movable ring for a friction drive mechanism.

Another object of the present invention is to provide a friction drive having negative droop characteristics.

Yet another object of the present invention is to provide a lightweight compact drive with the reliability of a mechanical friction drive but embodying a simple construction utilizing a reduced number of inexpensively produced parts.

Many other advantages, features and additional objects of the present invention will become manifest to those versed in the art upon making reference to the detailed description which follows and the accompanying sheets of drawings in which several preferred embodiments are illustrated for purposes of disclosing the novel mechanical constructions and the novel methods of operation claimed herein.

On the drawings:

Figure 1 is a cross-sectional view, with parts removed, of a drive mechanism provided in accordance with the principles of the present invention;

Figure 2 is a fragmentary developed view showing additional details of a cam ring construction incorporated in the drive mechanism of the present invention;

Figures 3 and 4 are diagrammatic views depicting the change in contact angle which occurs when the balls are moved radially inwardly (Figure 3) and radially outwardly (Figure 4);

Figure 5 is a view similar to Figure 1 but showing an alternative construction of a drive mechanism provided in accordance with the principles of the present invention and specifically endowed with negative droop characteristics; and Figure 6 is a view similar to Figure 2 and shows a development of the cam ring arrangement incorporated in the embodiment of Figure 5.

As shown on the drawings:

Although the principles of the present invention are of general applicability, the structural embodiments herein shown by way of illustrative example are specifically adapted for use as a constant speed, friction-type aircraft alternator drive.

The drive assembly is indicated generally at 10 and includes a casing means shown generally at 11 forming a gear box 12 and a housing 13 in which is housed the specific friction drive of the present invention.

Power is supplied to the drive mechanism through a shaft 14 splined as at 16 to a gear 17 meshing within the gear box 12 by means of other gearing (not shown) with a gear 18, in turn, splined as at 19 with a shaft member 20 extending into the housing 13.

It will be understood that the shaft 14 and the gears 17 and 18 are suitably supported within the casing means 11 by bearings which details of construction need not be described for an understanding of the present invention.

The shaft member 20 is splined as at 21 to a rotatable race ring 22 which comprises the input race ring of a system of race rings including inner and outer pairs of race rings confining an annular row of balls or planetary members 23.

The input race ring 22 is constrained against axial movement with respect to ring 51 by a stop ring 24 keyed in an annular recess 26 formed in the outer peripheral surface of an axially extending sleeve 27 flanged as at 28 and the pair is free to float axially, and do move axially, to center the assembly on the driving balls 23.

The input race ring 22 has a curved bearing surface 29 which closely approximates the curvature of the balls 23, but being of sufficiently greater curvature to afford a material change of contact angle through radial movement of the balls 23.

Radially outwardly of the input ring 22 there is provided an output race ring 30 which is connected to and integral with a cylindrical extension 31 splined as at 32 with an output shaft 33. The end of the output shaft 33 is supported for rotation in a bearing assembly 34 and has a splined coupling portion 36 by means of which a connection can be effected with a device to be driven, for example, an electrical alternator.

The outer peripheral surface of the cylindrical portion 31 is recessed to provide a radial shoulder 37 which abuts against the inner race ring of a bearing assembly indicated generally at 38. The opposite end of the bearing assembly 38 abuts against a shoulder 39 provided by a sleeve 40. A washer 40a abuts against the end of the sleeve 40 and is retained in assembly therewith by means of one or more bolts 41 threaded into corresponding threaded apertures 41a in the end of the cylinder portion 31.

As shown in Figure 1, there is also provided an axially movable non-rotating race ring 42 which, for convenience in identification, may be referred to as the cam ring 42 or torque reaction control ring 42. The cam ring 42 and the output ring 30 are axially opposite one another in the embodiment of Figure 1 and both are provided with bearing surfaces indicated at 43 and 44, respectively, which closely approximate the curvature of the balls 23, but which are flared sufficiently to effect a material change of contact angle upon relative radial movement of the balls 23.

Axially opposite the input ring 22, there is provided the axially movable non-rotatable race ring which will be referred to herein as the speed control ring 46. The speed control ring 46 has a curved bearing surface 47 approximating the curvature of the balls 23 but flared slightly similar to the bearing surfaces 29, 43 and 44 on the other ring members.

The speed control ring 46 is flanged as at 48, thereby providing a pair of radially spaced axially extending surfaces 49 and 50 which slidably engage adjoining sealing surfaces provided by a supporting member 51. The movable speed control ring 46 is further characterized by a back face or rear wall 52 which, together with means including the support member 51, forms a pressure control chamber 53, the wall or face 52 being spaced from an adjoining wall surface 54 on the support member 51 and the wall or face 52 comprising a motive surface adapted to be pressure-loaded with fluid at increased pressure, thereby to develop a thrust urging the movable speed control ring 46 in axial direction towards the planetary balls 23.

The back face or surface 52 of the movable control ring 46 is recessed and receives in the recess a bowed spring washer 56 having one peripheral edge engaging against the face or surface 52 and having the opposite peripheral edge engaging the wall 54, thereby providing a continuous biasing means to preload the movable speed control ring 46 in axial direction.

Appropriate recesses and sealing means are provided at the surfaces 49 and 50 as is indicated at 58, thereby to seal fluid at increased pressure within the pressure control chamber 53. Means are provided including a passage 59 to conduct fluid at increased pressure into the pressure control chamber 53 as regulated by a speed sensing device shown diagrammatically. Thus, the pressure control chamber 53 together with the speed control ring 46 controls ball position and ratio by oil volume within the chamber 53, whether the pressure therein is high or low. The force on the balls 23 is controlled by the torque reacting ring 42 and that, in turn, changes the oil pressure in the chamber 53.

Referring to Figure 1 in connection with Figure 2, it will be noted that the torque reacting or cam ring 42 has a back face 60 which is particularly characterized by an irregularly-shaped camming surface 61 providing a plurality of inclined surfaces 62. There is also provided a backing ring 63 having a cam face 64 spaced from and confronting the face 60 and containing a similar irregular-shaped cam groove forming a plurality of inclined surfaces 66. Received in the recess between the cam grooves and simultaneously engaging the inclined surfaces 62 and 66, are a plurality of shiftable members which may conveniently comprise bearing balls 67.

There is thus provided in the race ring system, a "one-way clutch" since the cam ring 42 together with its backing ring 63 is torque-responsive, being axially moved in response to rotation of the balls 23 in one direction. If the drive mechanism of the embodiment of Figure 1 is used to drive an alternator and the alternator starts to drive, then what is normally the output race ring 30 becomes the input. Under such conditions of operation, the ball bearings 67 back into the cam surfaces 62 and 66 because the load or force on the balls is reduced to the minimum provided by the pre-load spring. Thus, the planetary balls 23 will be permitted to "skid" with respect to the non-rotating cam ring 42.

According to the operation of the device of this invention, a condition of equilibrium is obtained so that constant speed transmission is effected by counteracting any increase in the driver, with a corresponding axial movement of the speed control ring 46. Thus, by selectively supplying fluid at increased pressure to the motive surface 52, as a function of the speed increase sensed by the governor of a speed sensing means (shown diagrammatically in Figures 1 and 5), the ratio between $R_i$ and $R_o$ may be maintained constant. In other words, (1) the governor senses a speed increase, (2) oil is pumped into the chamber 54, (3) the rings 22 and 46 are forced together, (4) the balls 23 move radially outward and (5) the speed decreases. The action is reversed in the embodiment of Figure 5.

It will be understood that the preloading of the movable control ring 46 by the spring washer 56 insures that torque loading will start rotation of the assembly. For example, if the transmission is started under no-load, it is desirable that there be an initial preloading of the movable control ring 46 to insure gripping at the critical surfaces and to prevent skidding.

The conditions of operation of the structure illustrated in Figure 1 is depicted diagrammatically in Figs. 3 and 4. If an increase in speed occurs in the driver, then because of the reaction on the output ring 30, the normal force on the cam ring 42 would tend to result in an increase in tangential force on the annular row of balls 67 carried between the camming surfaces 62 and 66. Consequently, the planetary balls 23 would tend to be forced radially inwardly because of the deflections in the components of the race ring system. If the balls would be forced inwardly, the point contact of any ball 23 with the cam ring 42 would be as indicated at 68, while the point contact of any ball 23 with the movable control ring 46 would be as indicated at 69. The point contact of any ball 23 with the output ring 30 is indicated at 70 and with the input ring 22 at 71. The effective input radius is indicated at $R_i$ and the effective output radius is indicated at $R_o$. Since $R_i$ is smaller than $R_o$, it will be appreciated that a change in radii which results when the balls are forced radially inwardly would result in a speed increase or a tendency towards a speed increase.

In Figure 4, the contact points are shifted corresponding to an outer position of the balls. When the balls 23 are shifted radially outwardly, $R_i$ is greater than $R_o$ and the change in radii results in a speed decrease, or a tendency towards a speed decrease.

In the structural embodiment described in Figure 1, there is provided a so-called positive droop characteristic in that radial inward movement of the planetary balls results in a speed increase, instead of a speed decrease. In some applications of a drive mechanism such a "positive" droop would not be desirable. It has been determined in accordance with the principles of the present invention that a normal negative droop which is desirable in paralleling electrical alternators may be obtained by disposing the movable speed control ring axially opposite the output ring. In other words, the movable speed control ring is on one inner ring and the output ring is on the other inner ring, or, alternatively, if the movable speed control ring is on one outer ring, then the output ring is on the other outer ring. By virtue of such arrangement, the droop, or speed fall-off with increased load will be in the right direction, as for example, in paralleling electrical alternators wherein the speed desirably tends to fall off as the load increases. By virtue of the provision of negative droop, the governing characteristics of the assembly are greatly enhanced.

The embodiment of Figure 5 illustrates a structure which affords normal negative droop characteristics. Because of the similarity in the structural features and operational principles, like reference numerals with the suffix *a* are employed wherever possible to identify parts corresponding to the parts already described in connection with the embodiment of Figure 1. The assembly is indicated generally at 10a and includes casing means 11a providing a gear box 12a and a housing 13a for the driving mechanism. Driving force is supplied through a shaft 14a and through a gear train which is contained within the gear box 12a and includes gear member 17a, in mesh with gear member 18a.

A splined driving connection 19a effects rotation of a driving sleeve 20a, in turn connected as at 21a to an input race ring 22a.

The input race ring 22a forms one component of a system of race rings and planetary balls including a movable torque reacting or cam ring 42a, a movable speed control ring 46a and an output ring 30a, all having contact with a plurality of planetary members or balls 23a.

In this embodiment, it will be noted that the innermost pair of rings include the output ring 30a and the movable speed control ring 46a, these two rings being disposed axially opposite one another. The outermost pair of rings includes the input ring 22a and the torque reacting or cam ring 42a.

The output ring 30a is integral with a cylindrical portion 31a and is splined as at 32a to a shaft member 33a rotatably journaled in a bearing assembly 34a and having a splined coupling 36a for effecting a connection with a device to be driven such as an alternator.

The cylindrical portion 31a has an annular shoulder 37a abutting against the inner race ring of a bearing assembly 38a which is abutted at its opposite end by other components of the mechanism, thereby insuring against axial displacement of the output ring 30a.

An inner shaft member 72 splined as at 73 to the cylindrical portion 31a is used to drive a scavenging pump 73, a cooling oil pump 74 and a governor pump 76 housed within one end of he casing means 11a.

The input ring 22a has a cylindrical portion 27a carried in the inner race ring of a combination journaling and thrust bearing assembly indicated generally at 77.

The movable speed control ring 46a, like the speed control ring 46 previously described, is preloaded by a suitable form of continuous biasing means such as the spring 56a and includes surfaces 49a and 50a sealed as at 58a to confine fluid at increased pressure in a control chamber 53a behind the motive face or surface 52a spaced from the wall 54a of the support member 51a.

Fluid at increased pressure is supplied to the control chamber 53a through a passage 59a connected to suitable speed sensing control means shown diagrammatically so that fluid may be supplied at increased pressure to the control chamber for acting on the motive surface 52a as a function of speed increase of the driver.

In the embodiment of Figure 5 and as noted in connection with a joint consideration of Figures 5 and 6, a modified form of torque-reacting cam is provided in connection with the cam ring 42a.

In order to control the normal forces on the cam ring components, the embodiment of Figures 5 and 6 utilizes a set of fixed rollers 80 on a single cam plate 81, which cam plate 81 has a plurality of inclined cam surfaces 82.

Thus, the cam ring 42a is provided with a straight back face 82 which engages against an adjoining face 83 of a cage member which is generally U-shaped in cross-section, supporting between its opposite leg portions an annular row of pins 84 each carrying a roller 80 suitably journaled by needle bearings or other antifriction means indicated at 86. There is thus simply and conveniently provided a curved cam surface which affords the friction drive of the present invention with a different slope or ratio in the different positions on the cam.

In operation, the embodiment of Figure 5 exhibits a normal negative droop in that radial inward movement of the planetary balls 23a will result in a speed decrease, or a tendency towards a speed decrease.

Where not specifically alluded to, it will be understood that the structural characteristics of the embodiment of Figure 5 are similar to the structural characteristics described in detail in connection with the embodiment of Figure 1 and, accordingly, like reference numerals with appropriate suffixes have been indicated in Figure 5.

Although minor structural modifications might be suggested by those versed in the art, it should be understood that I wish to embody within the scope of the patent warranted hereon all such modifications as reasonably and properly come within the scope of my contribution to the art.

I claim as my invention:

1. A speed ratio power transmission mechanism comprising a plurality of concentrically disposed race rings and an annular row of balls held in rolling contact with each of said race rings, said race rings including an input ring and an output ring each facing the same way and one being fixed against relative axial displacement and further including two rings facing the opposite way, both of said two rings being axially movable and one of said two rings having a back face forming together with adjoining means a pressure control chamber, the other of said two rings having one way torque loading device operably connected thereto to hold said other ring in rolling contact with said balls, continuous biasing means in said chamber to preload said one ring, and speed responsive means supplying pressurized fluid to said pressure control chamber for moving said one ring towards said annular row of rings as a function of the speed increase, whereby constant speed ratio between said output and input rings is maintained.

2. A constant speed drive comprising an inner pair and an outer pair of axially separable concentric race rings, planetary means having rolling contact with each race ring, a one-way torque loading device tending to close together one pair of said race rings, and speed responsive means adjustably controlling the separation of the other pair of race rings as a function of the variations in driving speed.

3. A constant speed drive comprising an inner pair and an outer pair of axially separable race rings, planetary members having rolling contact with each race ring, a one-way torque loading device tending to close together one pair of said race rings, the other pair of said race rings including a movable member having a motive pressure surface formed thereon, continuous biasing means preloading said movable member, means for confining pressurized fluid behind said motive surface, and means for communicating fluid at increased pressure to said motive surface to load said movable member as a function of the driving speed.

4. A constant speed friction drive comprising inner and outer pairs of axially separable race rings, an annular row of planetary means having rolling contact with each said member, one of said race rings comprising an input ring, another of said race rings comprising an output ring, a third of said rings being axially adjustably movable as a function of driving speed, the fourth of said rings being one way torque-loaded to be held thereby in continuous rolling contact with the planetary members, and speed-responsive means loading said adjustable third ring as a function of the driving speed, said output ring and said adjustable third ring being oppositely paired on the same axis with one another to afford the exhibition of a speed droop characteristic in said drive, whereby radial inward movement of said planetary means in response to increased driving speed will tend to produce a decrease in driven speed.

5. A constant speed friction drive comprising inner and outer pairs of axially separable race rings, an annular row of planetary means having rolling contact with each said member, one of said race rings comprising an input ring, another of said race rings comprising an output ring, a third of said rings being axially adjustably movable as a function of driving speed, the fourth of said rings being one way torque-loaded to be held thereby in rolling contact with the planetary members, and speed-responsive means loading said adjustable third ring as a function of the driving speed, said output ring and said adjustable third ring being oppositely paired on the same axis with one another to afford the exhibition of a speed droop characteristic in said drive, whereby radial inward movement of said planetary means in response to increased load on said output ring will tend to produce a decrease in speed, said speed responsive means comprising a motive surface on said third ring and means for hydraulically loading said motive surface to move said third ring axially as a function of driving speed.

6. In a drive mechanism, four load-delivering race rings confining an annular row of planetary balls, two of said race rings comprising a pair of axially opposed rings including an output ring and an axially movable adjustable speed control ring, preloading means continuously biasing said speed control ring, and means confining a supply of fluid at increased pressure behind said speed control ring to adjust said speed control ring axially.

7. In a drive mechanim, four load-delivering race rings confining an annular row of planetary balls, two of said race rings comprising a matched pair of axially opposed rings including an output ring and an axially movable adjustable speed control ring, continuous biasing means preloading said speed control ring, and variable loading means including a motive surface on said speed control ring, means confining fluid behind said motive surface, and means to supply fluid at increased pressure to said motive surface as a function of the driving speed.

8. A speed ratio power transmission mechanism comprising a plurality of concentrically disposed race rings and an annular row of balls held in rolling contact with each of said race rings, said race rings including a rotatable input ring and a rotatable output ring each facing the same way and one being fixed against relative axial displacement, said race rings further including two non-rotatable rings facing the opposite way, both of said two non-rotatable rings being axially movable and one of said rings having a back face forming together with adjoining means a pressure control chamber, the other of said two rings having one-way torque loading means operatively connected thereto to hold said other ring in rolling contact with said balls, and speed responsive means supplying pressurized fluid to said pressure control chamber to pressure-load said one ring towards said annular row of rings as a function of the driving speed, whereby a constant speed ratio between said input and output rings is maintained.

9. A speed ratio power transmission mechanism as defined in claim 8, said one-way torque-loading means including an annular row of fixed rollers engageable against a single cam plate having a plurality of inclined cam surfaces of variable slope.

10. A speed ratio power transmission mechanism as defined in claim 8, said one-way torque-loading means comprising an annular row of balls disposed between two cam plates having confronting, generally parallel inclined cam surfaces.

11. A speed ratio power transmission mechanism comprising a plurality of concentrically disposed race rings and an annular row of balls held in rolling contact with each of said race rings, said race rings including a rotatable input ring and a rotatable output ring each facing the same way and fixed against relative axial displacement, said race rings further including two non-rotatable rings facing the opposite way, both of said two non-rotatable rings being axially movable and one of said rings being disposed axially opposite said output ring, means forming with one face of one of said rings a pressure control chamber, and means supplying pressurized fluid to said chamber to move said one ring as a function of the driving speed, thereby to endow said mechanism with a speed droop characteristic.

12. A speed ratio power transmission mechanism comprising a plurality of concentrically disposed race rings and an annular row of balls held in rolling contact with each of said race rings, said race rings including a rotatable input ring and a rotatable output ring each facing the same way and fixed against relative axial displacement, said race rings further including two non-rotatable rings facing the opposite way, one of said two non-rotatable rings being axially movable as a function of driving speed and having a back face forming together with adjoining means a pressure control chamber, and speed responsive means supplying pressurized fluid to said pressure control chamber to move said one ring towards said annular row of balls as a function of the driving speed variations whereby a constant speed ratio between said input and output rings is maintained.

13. In a drive mechanism, four load-delivering race rings confining an annular row of planetary balls, two of said race rings comprising a pair of axially opposed rings including an output ring and an axially movable adjustable speed control ring, the other two of said rings comprising an input ring and an axially adjustable torque-reacting ring, each of said rings having a curved bearing surface closely approximating the curvature of the balls but being of sufficiently greater curvature to afford a material change of contact angle through radial movement of the balls, means for moving said speed control ring as a function of the driving speed and means for adjusting said torque reacting ring as a function of load or torque reaction.

14. A speed ratio power transmission mechanism comprising a plurality of concentrically disposed race rings and an annular row of balls held in rolling contact with each of said race rings, said race rings including an input ring and an output ring, each facing the same way and one being fixed against relative axial displacement and further including ring means facing the opposite way, said ring means being axially movable and including a back face forming together with adjoining means a pressure control chamber, and speed-responsive means supplying pressurized fluid to said pressure control chamber for selectively moving said ring means towards said annular row of rings as a function of the speed increase, whereby constant speed ratio between said output and input rings is maintained.

References Cited in the file of this patent
UNITED STATES PATENTS

| 2,349,981 | Mulder | May 30, 1944 |
| 2,696,888 | Chillson et al. | Dec. 14, 1954 |
| 2,701,970 | Kraus | Feb. 15, 1955 |